(12) United States Patent
Hwang et al.

(10) Patent No.: US 10,801,547 B2
(45) Date of Patent: *Oct. 13, 2020

(54) ROLLING BEARING AND MOTOR HAVING THE SAME

(71) Applicant: LG ELECTRONICS INC., Seoul (KR)

(72) Inventors: Eunji Hwang, Seoul (KR); Sunggi Kim, Seoul (KR); Hangjin Ban, Seoul (KR); Donghan Kim, Seoul (KR); Byungjik Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,793

(22) Filed: Feb. 13, 2019

(65) Prior Publication Data

US 2019/0178289 A1 Jun. 13, 2019

Related U.S. Application Data

(63) Continuation of application No. 15/698,960, filed on Sep. 8, 2017, now Pat. No. 10,247,237.

(30) Foreign Application Priority Data

Sep. 9, 2016 (KR) .................. 10-2016-0116431
Sep. 9, 2016 (KR) .................. 10-2016-0116748

(51) Int. Cl.
*F16C 27/06* (2006.01)
*F16C 33/58* (2006.01)
(Continued)

(52) U.S. Cl.
CPC ............ *F16C 27/066* (2013.01); *F16C 19/02* (2013.01); *F16C 19/06* (2013.01);
(Continued)

(58) Field of Classification Search
CPC ........ F16C 19/02; F16C 19/06; F16C 27/066; F16C 32/0603; F16C 33/583;
(Continued)

(56) References Cited

U.S. PATENT DOCUMENTS 1,828,304 A * 10/1931 Woodman .............. B65G 15/54
245/10
2,534,142 A 12/1950 Morton
(Continued)

FOREIGN PATENT DOCUMENTS

CA 2348221 A1 * 11/2002
DE 102009015162 A1 * 9/2010
(Continued)

OTHER PUBLICATIONS

Extended European Search Report in European Application No. 17190142.4, dated Feb. 13, 2018, 7 pages.

*Primary Examiner* — Marcus Charles
(74) *Attorney, Agent, or Firm* — Fish & Richardson P.C.

(57) ABSTRACT

A rolling bearing includes an inner rim fixed to a rotating shaft, an outer rim spaced apart from the inner rim, a rolling member disposed between the inner rim and the outer rim, and an elastic mesh defining a plurality of through-holes and surrounding an outer circumferential surface of the outer rim.

16 Claims, 11 Drawing Sheets

(51) Int. Cl.
*F16C 43/04* (2006.01)
*F16C 19/02* (2006.01)
*H02K 5/173* (2006.01)
*F16C 19/06* (2006.01)
*F16C 32/06* (2006.01)

(52) U.S. Cl.
CPC ........ *F16C 32/0603* (2013.01); *F16C 33/583* (2013.01); *F16C 33/586* (2013.01); *F16C 43/04* (2013.01); *H02K 5/173* (2013.01); *H02K 5/1732* (2013.01); *F16C 2300/22* (2013.01); *F16C 2380/26* (2013.01)

(58) Field of Classification Search
CPC .... F16C 33/586; F16C 43/04; F16C 2300/22; F16C 2380/26; H02K 51/173; H02K 5/1732
USPC ......... 384/215, 535–536, 582; 403/203, 223, 403/372; 87/3–4, 24, 42, 53; 140/12, 84
See application file for complete search history.

(56) References Cited

U.S. PATENT DOCUMENTS

| | | | |
|---|---|---|---|
| 3,033,622 A * | 5/1962 | Renner | F16C 27/04 384/537 |
| 3,061,386 A | 10/1962 | Willy et al. | |
| 3,372,963 A | 3/1968 | Harris et al. | |
| 3,409,338 A * | 11/1968 | Root | F16C 23/084 384/608 |
| 3,467,451 A | 9/1969 | Marley | |
| 3,568,962 A * | 3/1971 | Janssen | F16C 27/066 384/536 |
| 3,976,340 A | 8/1976 | Pitner | |
| 4,509,871 A | 4/1985 | Herzog et al. | |
| 4,772,139 A | 9/1988 | Bretton | |
| 5,044,789 A | 9/1991 | Damon et al. | |
| 5,159,166 A * | 10/1992 | Arnosti | B65H 51/06 384/536 |
| 5,819,871 A | 10/1998 | Takaoka | |
| 6,149,382 A | 11/2000 | Englander et al. | |
| 7,223,020 B2 | 5/2007 | Bauer et al. | |
| 7,401,981 B2 | 7/2008 | Matheny | |
| 7,478,952 B2 | 1/2009 | Faust et al. | |
| 7,559,146 B2 * | 7/2009 | Greenwood | B01D 39/12 264/103 |
| 7,610,671 B2 | 11/2009 | Watkins et al. | |
| 8,157,450 B2 | 4/2012 | Hosmer et al. | |
| 8,337,090 B2 | 12/2012 | Herborth et al. | |
| 8,414,448 B2 | 4/2013 | Madge et al. | |
| 8,615,318 B2 | 12/2013 | Bancalari | |
| 9,224,409 B2 | 12/2015 | Nias et al. | |
| 2001/0002630 A1 | 6/2001 | Watanabe et al. | |
| 2003/0169951 A1 | 9/2003 | Nishijima et al. | |
| 2007/0096572 A1 | 5/2007 | Watkins et al. | |
| 2015/0198084 A1 | 7/2015 | Daimer | |

FOREIGN PATENT DOCUMENTS

| | | |
|---|---|---|
| EP | 2899414 | 1/2014 |
| JP | 2004-229429 | 8/2004 |
| JP | 2006038222 A | 2/2006 |
| JP | 2011-185144 | 9/2011 |
| KR | 10-2006-0032031 | 4/2006 |
| KR | 20-2008-0004155 | 1/2008 |
| KR | 10-1287468 | 7/2013 |
| KR | 10-1633673 | 6/2016 |
| KR | 10-2016-0097885 | 8/2016 |
| SU | 697760 A * | 11/1979 |
| SU | 1225978 A * | 4/1986 |

\* cited by examiner

ROLLING BEARING AND MOTOR HAVING THE SAME

CROSS-REFERENCE TO RELATED APPLICATIONS

This application is a continuation of U.S. patent application Ser. No. 15/698,960, filed on Sep. 8, 2017, now U.S. Pat. No. 10,247,237, which claims priority under 35 U.S.C. §§ 119 and 365 to Korean Patent Applications No. 10-2016-0116431, filed on Sep. 9, 2016, and No. 10-2016-0116748, filed on Sep. 9, 2016, which are hereby incorporated by reference in their entirety.

FIELD

The present disclosure relates to a rolling bearing and a motor having the same, and more particularly, to a rolling bearing having a rolling member and a motor having the same.

BACKGROUND

A bearing is a mechanical element that can fix a shaft at a certain position and rotate the shaft while supporting the shaft.

Bearings may be classified into a sliding bearing and a rolling bearing according to their contact state. The bearings may include an air foil bearing and the like. The air foil bearing is lubricated using an ambient air without use of lubricating oil from the motor. The air foil bearing including a top foil which is spaced apart from the shaft and a bump foil which is disposed on the outer circumference of the top foil. The air foil bearing may convert an air flow between the top foil and the shaft in the pressure and perform a lubricating function.

A rolling bearing may support a rotating shaft and include a rolling member such as a ball, roller, or needle which rotates together with an inner rim of the rolling bearing. The rolling bearing has a high reliability in its high-speed rotation. The rolling bearing can be used in a motor such as an electric motor, compressor, a generator, a transmission, or the like, which may include a rotating shaft that can rotate at a high speed.

When a rolling bearing is mounted in a motor, the rolling bearing may be supported by a motor body forming an external appearance of the motor, or may be supported by a bracket separately installed in the motor body. The weight of a rotating shaft may be transferred to the motor body or the bracket through the rolling bearing.

In some examples, the motor having the rolling bearing mounted therein may include an assembly of a plurality of parts and have an assembly tolerance. The rolling bearing provided in the motor and disposed in the motor housing can be distorted due to the assembly tolerance. In this case, the amount of abrasion of the rolling bearing may increase, and the lifespan of the rolling bearing may be shortened.

SUMMARY

This application describes implementations of a rolling bearing and a motor having the same in which the center axis of the rolling bearing can be easily adjusted, and heat of an outer rim can be more rapidly dissipated.

According to one aspect of the subject matter described in this application, a rolling bearing includes an inner rim fixed to a rotating shaft, an outer rim spaced apart from the inner rim, a rolling member disposed between the inner rim and the outer rim, and an elastic mesh defining a plurality of through-holes and surrounding an outer circumferential surface of the outer rim.

Implementations according to this aspect may include one or more of following features. The outer rim may be press-fitted into the elastic mesh, and the elastic mesh may face the outer circumferential surface of the outer rim. The elastic mesh may include a metal wire mesh in which at least one metal wire has a shape that includes one or more of curved portions. The rolling bearing may further include an inner holder disposed between the outer rim and the elastic mesh, and the inner holder may have an inner surface that contacts the outer circumferential surface of the outer rim and an outer surface that contacts the elastic mesh.

In some implementations, the inner holder may include an outer rim holder part that has a circular or arc shape and that surrounds the outer rim in which the outer rim holder part contacts the outer circumferential surface of the outer rim, and a fixing part that protrudes from the outer rim holder part. In some cases, the elastic mesh may have a first end that faces a first surface of the fixing part and a second end that faces a second surface of the fixing part opposite the first surface.

In some implementations, the elastic mesh may include a contact part contacting the outer rim and a spacing part spaced apart from the outer rim in which the contact part and the space part being alternately located along the outer rim. The through-holes may be defined in at least one of the contact part and the spacing part. In some examples, the elastic mesh may include a mesh part that defines the through-holes and that is curled at least twice.

In some implementations, the elastic mesh may include an inner mesh part located at an innermost side in a radial direction in which the inner mesh part contacts the outer circumferential surface of the outer rim, and an outer mesh part located at an outermost side in the radial direction in which the through-holes are defined in each of the inner mesh part and the outer mesh part.

According to another aspect of the subject matter described in this application, a motor includes a motor body, a bracket installed within the motor body, and at least one rolling bearing that supports a rotating shaft located in the motor body in which at least one of the motor body and the bracket comprises a rolling bearing housing part that supports the rolling bearing. The rolling bearing includes an inner rim fixed to the rotating shaft, an outer rim spaced apart from the inner rim, a rolling member disposed between the inner rim and the outer rim, and an elastic support structure that is porous and that surrounds an outer circumferential surface of the outer rim. The rolling bearing housing part contacts the elastic support structure to thereby support the elastic support structure.

Implementations according to this aspect may include one or more of following features. The elastic support structure may be an elastic mesh that defines a plurality of through-holes. The outer rim may be press-fitted into the elastic mesh, and the elastic mesh may face the outer circumferential surface of the outer rim. In some examples, the elastic mesh may include a metal wire mesh in which at least one metal wire has a shape that includes one or more curved portions.

In some implementations, the rolling bearing may further include an inner holder disposed between the outer rim and the elastic mesh. The inner holder includes an outer rim holder part that has an inner surface contacting the outer circumferential surface of the outer rim and an outer surface contacting the elastic mesh, and a fixing part that extends from the outer rim holder part to the rolling bearing housing part and that is fixed to the rolling bearing housing part.

In some implementations, the rolling bearing housing part may define a fixing groove that receives the fixing part. The elastic mesh may have a first end that faces a first surface of the fixing part and a second end that faces a second surface of the fixing part. The elastic mesh may include a contact part contacting the outer rim, and a spacing part spaced apart from the outer rim in which the contact part and the spacing part being alternately located along the outer rim. The spacing part may contact the rolling bearing housing part, and the plurality of through-holes may be defined in at least one of the contact part and the spacing part.

In some implementations, the elastic mesh further includes a mesh part that defines the plurality of through-holes and that is curled at least twice. In some examples, the elastic mesh may further include an inner mesh part that is located at an innermost side in a radial direction and that contacts the outer circumferential surface of the outer rim, and an outer mesh part that is located at an outermost side in the radial direction and that contacts the rolling bearing housing part. In some cases, the plurality of through-holes may be defined in each of the inner mesh part and the outer mesh part.

In some implementations, the outer rim may have an outer diameter less than an inner diameter of the rolling bearing housing part, and the elastic mesh may be disposed between the outer circumferential surface of the outer rim and an inner surface of the rolling bearing housing part. In some examples, the plurality of through-holes may face each of the outer circumferential surface of the outer rim and the inner surface of the rolling bearing housing part. The elastic mesh may have a thickness equal to or less than a gap defined between the outer circumferential surface of the outer rim and an inner circumferential surface of the rolling bearing housing part in which the elastic mesh is configured to be press-fitted into the gap.

DETAILED DESCRIPTION

Hereinafter, exemplary implementations of the present disclosure will be described in detail with reference to the accompanying drawings.

Figure 1:
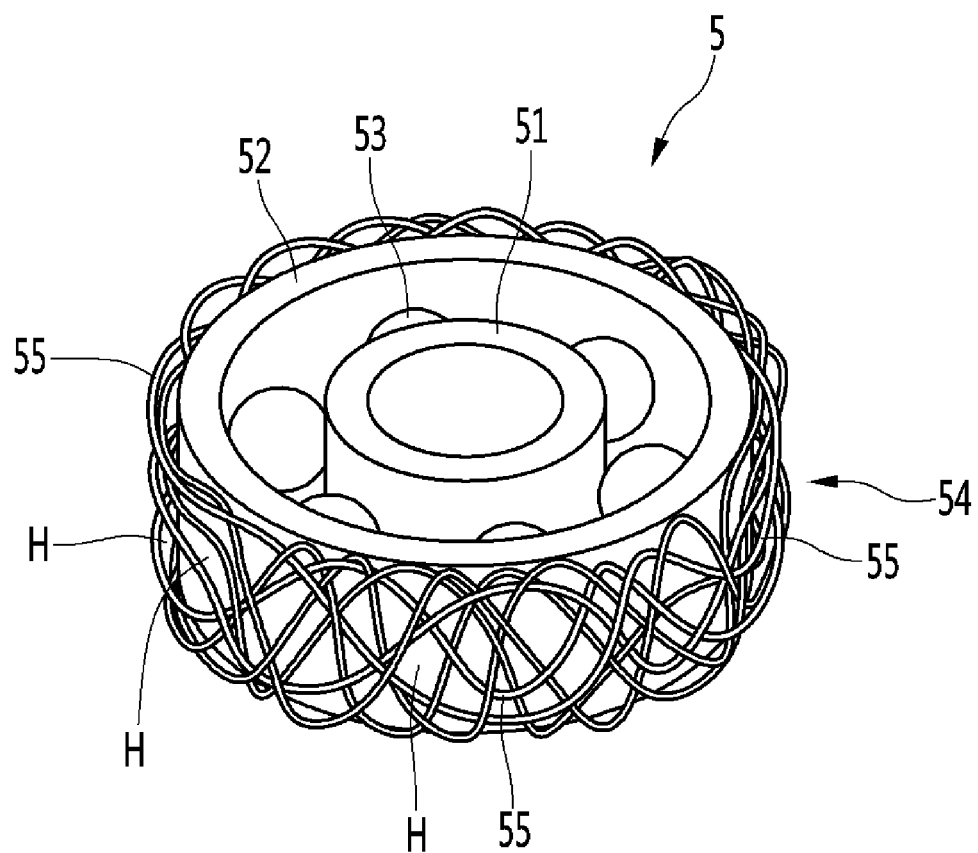
FIG. 1 is a perspective view showing an example rolling bearing.
Figure 2:
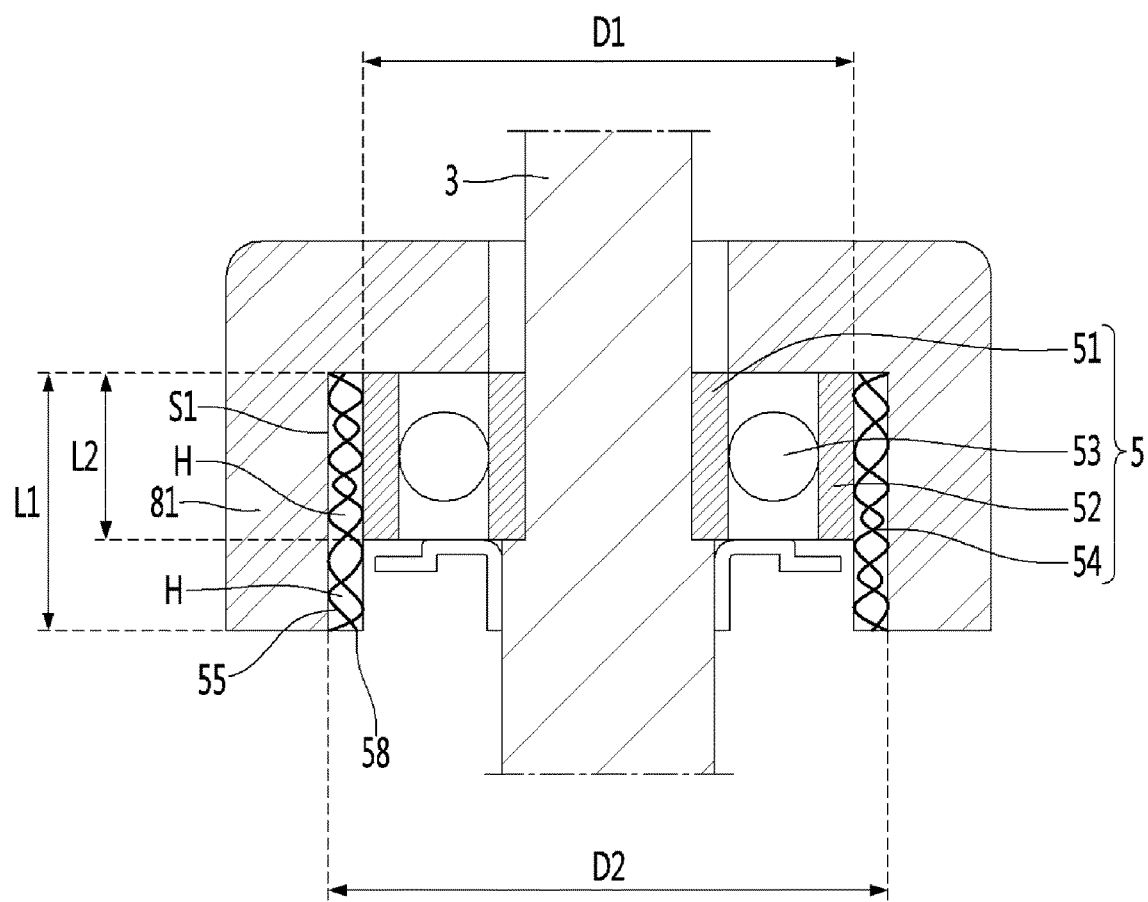
FIG. 2 is a sectional view showing the example rolling bearing.
Figure 3:
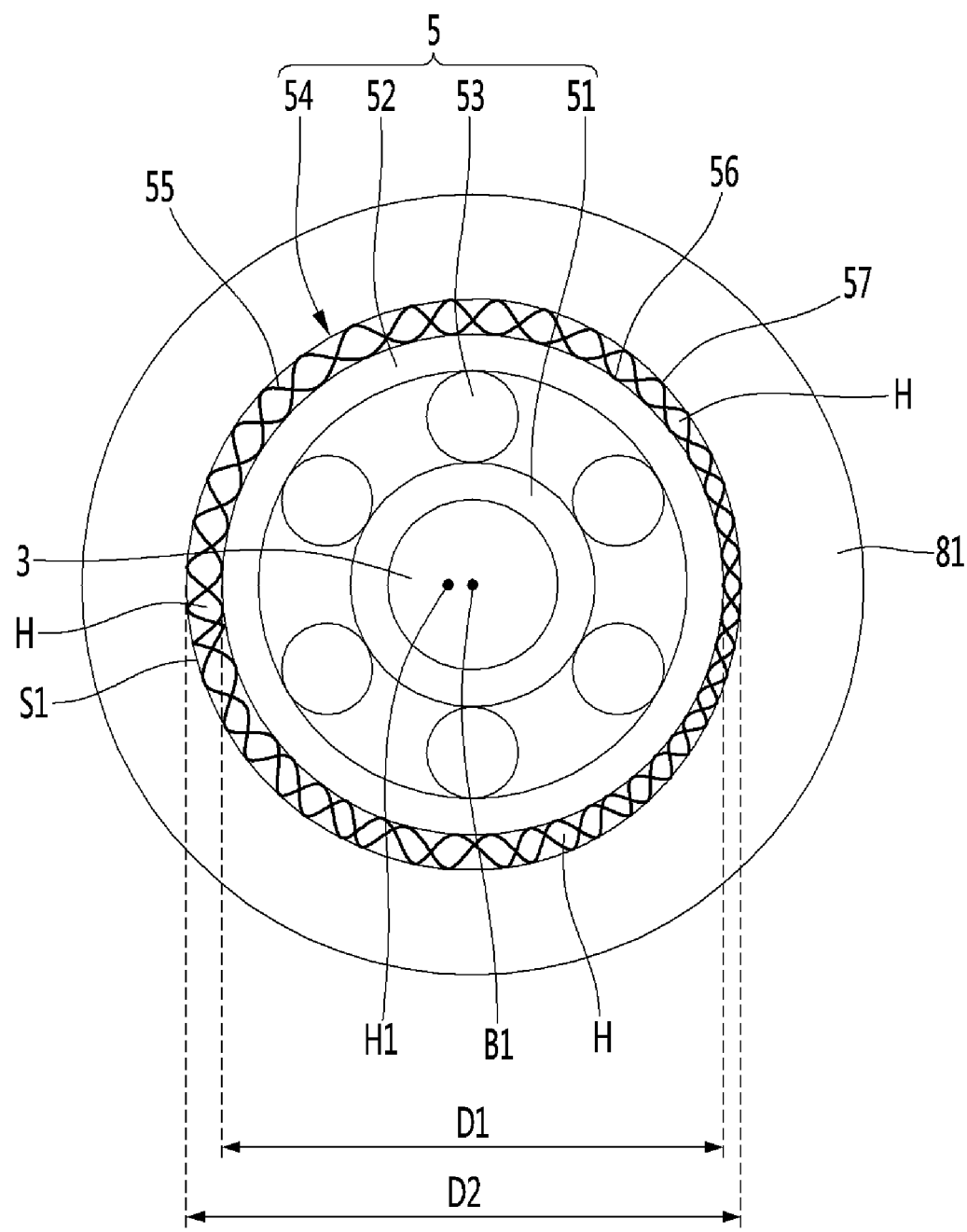
FIG. 3 is a cross-sectional view showing the rolling bearing shown in FIG. 2 with an example elastic mesh elastically deformed.

FIG. 1 is a perspective view showing an example rolling bearing. FIG. 2 is a sectional view showing the example rolling bearing. FIG. 3 is a cross-sectional view showing the rolling bearing when an example elastic mesh shown in FIG. 2 is elastically deformed.

The rolling bearing 5 may include an inner rim 51 fixed to a rotating shaft 3, an outer rim 52 spaced apart from the inner rim 51, a rolling member 53 disposed between the inner rim 51 and the outer rim 52, and an elastic mesh 54 surrounding the outer circumferential surface of the outer rim 52, the elastic mesh 54 having a plurality of through-holes H formed therein.

In some implementations, the rolling bearing 5 may be mounted in an electric motor having a rotating shaft, such as a motor or compressor, and may rotatably support the rotating shaft 3. The electric motor may include a rolling bearing housing part 81 surrounding the rolling bearing 5, and the rolling bearing 5 may support the rotating shaft 3 in a state in which the rolling bearing 5 is accommodated in the rolling bearing housing part 81. The rolling bearing housing part 81 may be formed in a hollow cylindrical shape, and may surround the outer circumference of the rolling bearing 5.

The rolling bearing 5 may be one of a roller bearing, a ball bearing, and a needle bearing. The motor having the rolling bearing 5 mounted therein may be a motor for a vacuum cleaner, which is used in the vacuum cleaner to suction air. In this case, the rolling bearing 5 may include a ball bearing having high performance in high-speed rotation.

The elastic mesh 54 may be mounted between the outer rim 52 and the rolling bearing housing part 81 to surround the outer rim 52. The elastic mesh 54 may be protected by the rolling bearing housing part 81 and the outer rim 52 between the rolling bearing housing part 81 and the outer rim 52.

An accommodation space S1 in which at least a portion of the elastic mesh 54 is accommodated may be formed between the outer rim 52 and the rolling bearing housing part 81. The external diameter D1 of the outer rim 52 may be smaller than the internal diameter D2 of the rolling bearing housing part 81, and the accommodation space S1 may be formed in a hollow cylindrical shape between the outer rim 52 and the rolling bearing housing part 81.

In some implementations, the rolling bearing 5 may be accommodated in the rolling bearing housing part 81 formed in the electric motor such as a motor or compressor in a state in which the inner rim 51, the outer rim 52, and the rolling member 53 are coupled to one another. After that, the elastic mesh 54 may be mounted to be inserted into the accommodation space S1 between the outer rim 52 and the rolling bearing housing part 81.

In some implementations, the rolling bearing 5 may be mounted to be inserted into the rolling bearing housing part 81 in a state in which all of the inner rim 51, the outer rim 52, the rolling member 53, and the elastic mesh 54 are coupled to one another.

When the rolling bearing 5 is mounted in the electric motor, the elastic mesh 54 may be elastically deformed by the outer rim 52 between the outer rim 52 and the rolling bearing housing part 81.

In some implementations, the elastic mesh 54 may have a hollow cylindrical shape. A cylindrical empty space may be formed inside the elastic mesh 54. The plurality of through-holes H may be formed to be open toward the radial and axial directions of the elastic mesh 54.

The center axis of the rolling bearing 5 and the center axis of the rolling bearing housing part 81 may be different from each other due to an assembly tolerance of the electric motor. In this case, a portion of the elastic mesh 54 may be compressed by the outer rim 52, and the elastic mesh 54 may support the outer rim 52 such that the center axis B1 of the outer rim 52 is different from the center axis H1 of the rolling bearing housing part 81.

The elastic mesh 54 may be adhered closely to the outer rim 52. The outer rim 52 may be press-fitted into the elastic mesh 54.

The internal diameter of the elastic mesh 54 may be formed equal to or smaller than the external diameter of the outer rim 52. The elastic mesh 54 may be elastically deformed while surrounding the outer rim 52. The elastic mesh 54 may extend such that the internal diameter of the elastic mesh 54 is equal to the external diameter D1 of the outer rim 52. The elastic mesh 54 may be adhered closely to the outer rim 52 to be fixed to the outer rim 52.

In some implementations, the elastic mesh 54 may be adhered closely to the rolling bearing housing part 81. The elastic mesh 54 may be press-fitted into the rolling bearing housing part 81.

The external diameter of the elastic mesh 54 may be formed equal to or greater than the internal diameter D2 of the rolling bearing housing part 81. The elastic mesh 54 may be elastically deformed while being inserted into the rolling bearing housing part 81. The elastic mesh 54 may be reduced such that the external diameter of the elastic mesh 54 is equal to the internal diameter D2 of the rolling bearing housing part 81. The elastic mesh 54 may be adhered closely to the rolling bearing housing part 81 to be fixed to the rolling bearing housing part 81.

At least a portion of the elastic mesh 54 may be press-fitted between the outer rim 52 and the rolling bearing housing part 81, and may be located between the rolling bearing housing part 81 and the outer rim 52 in the state in which the portion is press-fitted.

In some implementations, the elastic mesh 54 may be formed in a structure in which the elastic mesh 54 is easily elastically deformed, and heat of the outer rim 52 is easily dissipated to the outside.

The plurality of through-holes H enables the elastic mesh 54 to be easily elastically deformed.

In some implementations, the plurality of through-holes H can assist the heat of outer rim 52 to be rapidly dissipated in the radial direction of the elastic mesh 54. At least one of the plurality of through-holes H may be formed to be open in the radial direction of the elastic mesh 54.

The plurality of through-holes H may be formed such that the heat of the outer rim 52 is dissipated in the axial direction of the elastic mesh 54. At least one of the plurality of through-holes H may be formed to be open in the axial direction of the elastic mesh 54.

In some implementations, the plurality of through-holes H may include the through-hole open in the radial direction, the through-hole open in the axial direction, and a through-hole opened in an oblique direction between the radial and axial directions.

In some implementations, the height L1 of the elastic mesh 54 may be greater than the height L2 of the outer rim 52. A portion of the elastic mesh 54 may be located between the outer rim 52 and the rolling bearing housing part 81, and the rest of the elastic mesh 54 may be located outside the accommodation space S1.

The plurality of through-holes H may include at least one first through-hole facing the outer rim 52 and at least one second through-hole not facing the outer rim 52.

The elastic mesh 54 may include a metal wire mesh in which at least one metal wire 55 is tangled. In the metal wire mesh, the metal wire 55 may be regularly or irregularly tangled, and may be tangled in a hollow cylindrical shape. In some examples, the metal wire 55 may have a shape that includes a plurality of curved portions such as a curled shape, a twisted shape, a wound shape, and a spiral shape, or the like.

The metal wire 55 of the elastic mesh 54 may include an inner contact part coming in contact with the outer rim 52. The metal wire 55 of the elastic mesh 54 may include an outer contact part coming in contact with the rolling bearing housing part 81. In some implementations, the elastic mesh 54 may include a plurality of metal wires 55 tangled with each other, and the plurality of metal wires 55 may include wire contact parts at which the plurality of metal wires 55 come in contact with each other.

In some implementations, the heat of the outer rim 52 may be transferred to the metal wire 55, and the heat transferred to the metal wire 55 may be transferred to the rolling bearing housing part 81 through the metal wire 55. In some implementations, the heat of the outer rim 52 may be transferred to air in the electric motor through the metal wire 55 and the through-holes H.

The elastic mesh 54, as shown in FIG. 3, may include an inner circumferential surface 56 facing the outer circumferential surface of the outer rim 52 and an outer circumferential surface 57 facing the inner circumferential surface of the rolling bearing housing part 81. In some implementations, the elastic mesh 54, as shown in FIG. 2, may include an end part 58 not facing the outer rim 52 and the rolling bearing housing part 81.

The through-holes H may be formed in the inner circumferential surface 56, the outer circumferential surface 57, and the end part 58 of the elastic mesh 54, respectively.

In some implementations, the end part 58 of the elastic mesh 54 may be located outside the accommodation space S1, and air outside the accommodation space S1 may be introduced into the elastic mesh 54 through the through-hole H formed in the end part 58 of the elastic mesh 54.

For example, air around the rolling bearing 5 may be introduced into the elastic mesh 54 through the through-hole H of the end part 58 not facing the outer rim 52 and the rolling bearing housing part 81. In some cases, the air introduced into the elastic mesh 54 may be introduced between the outer rim 52 and the rolling bearing housing part 81 while passing through the through-hole H of the elastic mesh 54. Heat of each of the outer rim 52, the elastic mesh 54, and the rolling bearing housing part 81 may be transferred to the air introduced through the through-hole H of the elastic mesh 54 to be dissipated.

The center axis of the rolling bearing 5 can be easily aligned by the plurality of through-holes H, and simultaneously, the heat of the outer rim 52 can be more rapidly and efficiently dissipated.

Figure 4:
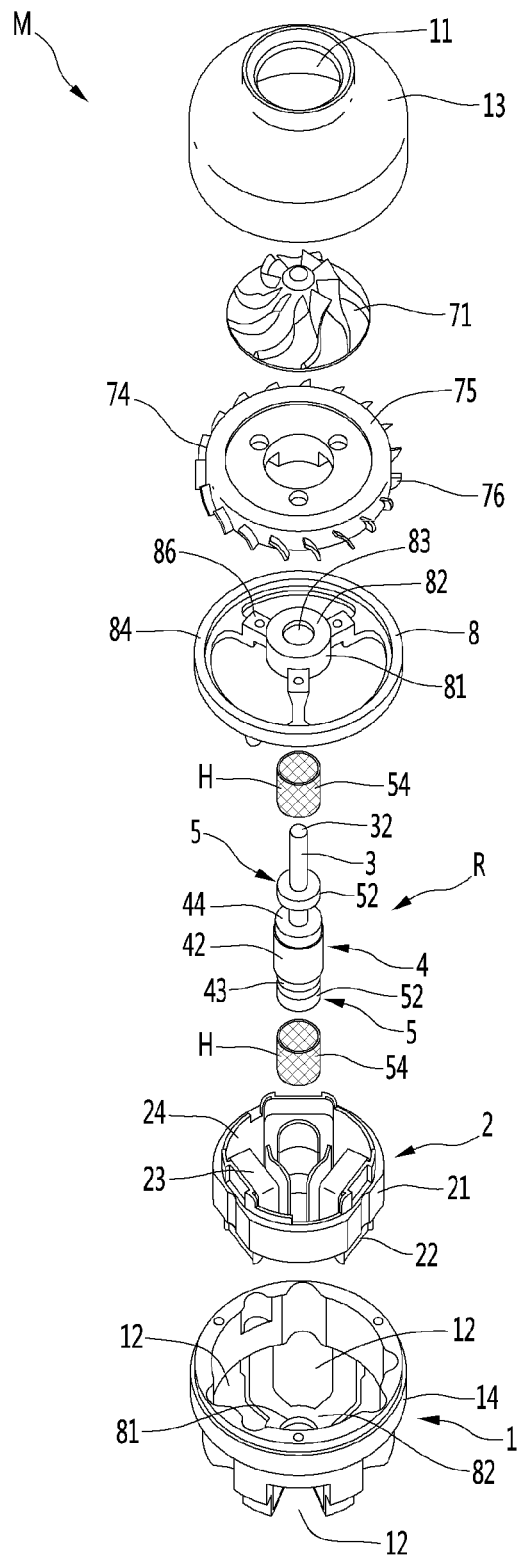
FIG. 4 is an exploded perspective view showing an example motor having the rolling bearing of FIG. 1.
Figure 5:
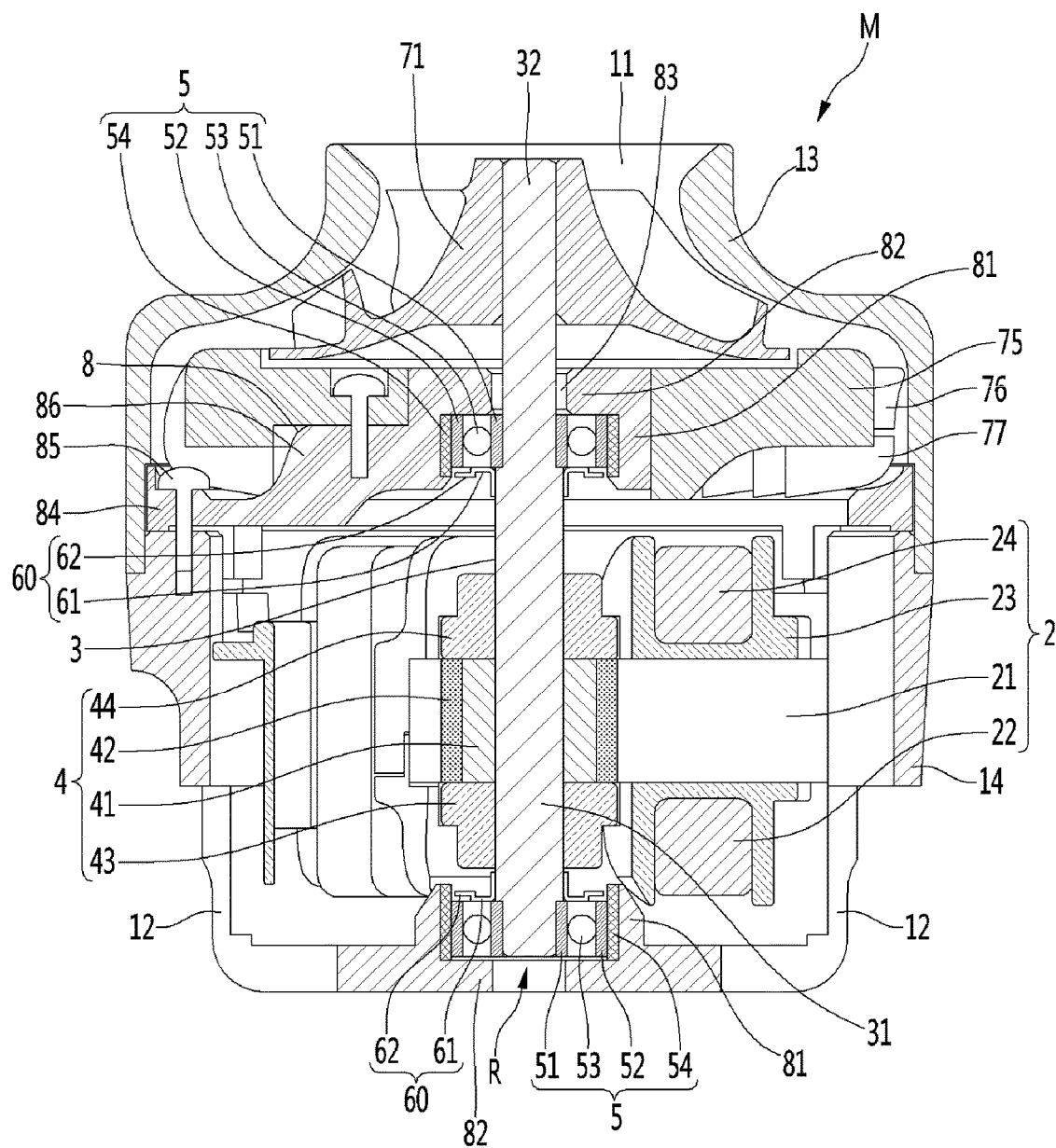
FIG. 5 is a sectional view showing the example motor having the rolling bearing of FIG. 1.

FIG. 4 is an exploded perspective view showing an example motor having the rolling bearing. FIG. 5 is a sectional view showing the motor having the rolling bearing.

The motor M having the rolling bearing of this implementation (hereinafter, referred to as a motor) may include a motor body 1, at least one rolling bearing 5 supporting a rotating shaft 3, and a bracket 8 installed in the motor body 1.

At least one of the motor body 1 and the bracket 8 may include a rolling bearing housing part 81 supporting the rolling bearing 5.

The rolling bearing 5, as shown in FIGS. 1 to 3, an inner rim 51, an outer rim 52, a rolling member 53, and an elastic mesh 54. The elastic mesh 54 may come in contact with the rolling bearing housing part 81 to be supported by the rolling bearing housing part 81.

The motor M may include a stator 2 mounted to the motor body 1 and a rotor 4 mounted to the rotating shaft 3.

The rotor 4 and the rolling bearing 5 may be mounted to be spaced apart from the rotating shaft 3. The rotating shaft 3, the rotor 4, and the rolling bearing 5 may constitute a rotating shaft assembly R.

In some implementations, the motor M may be configured to suction external air and dissipate heat inside the motor M. The motor M may further include an impeller 71 connected to the rotating shaft 3 and a diffuser 74 guiding air flowed by the impeller 71.

The motor body 1 may form an external appearance of the motor M. An air inlet 11 through which air outside the motor M is suctioned into the motor body 1 may be formed in the motor body 1. A space in which the stator 2, the rotor 4, the rotating shaft 3, the rolling bearing 5, the bracket 8, and the impeller 71 are accommodated may be formed inside the motor body 1. An air outlet 12 through which air inside the motor M is discharged to the outside of the motor body 1 may be formed in the motor body 1.

The motor body 1 may be configured as an assembly of a plurality of members. The motor body 1 may include an impeller cover 13 having the air inlet 11 formed therein. The motor body 1 may further include a motor housing 14 having the air outlet 12 formed therein. The impeller cover 13 may be coupled to the motor housing 14, and the motor housing 14 may constitute the motor body 1 together with the impeller cover 13.

In some implementations, the motor body 1 may further include a separate frame disposed between the impeller cover 13 and the motor housing 14. Each of the impeller cover 13 and the motor housing 14 may be coupled to the frame.

In the motor M, a portion of the bracket 8 may be disposed between the impeller cover 13 and the motor housing 14, and each of the impeller cover 13 and the motor housing 14 may be coupled to the bracket 8. In this case, the bracket 8 may constitute a portion of the motor body 1.

The impeller cover 13 may surround the outer circumference of the impeller 71. The impeller cover 13 may protect the impeller 71 by surrounding the outer circumference of the impeller 71.

The impeller cover 13 may have an open surface facing the motor housing 14. The impeller cover 13 may be disposed to cover an open surface of the motor housing 14. The impeller cover 13 may be coupled to the motor housing 14 or the bracket 8 using a fastening member such as a screw, or may be screw coupled to the motor housing 14 or the bracket 8.

The air inlet 11 may be formed smaller than the surface of the impeller cover 13, which faces the motor housing 14.

The inner circumferential surface of the impeller cover 13 may be spaced apart from the impeller 71, and the air flowed by the impeller 71 may be flowed through between the inner circumferential surface of the impeller cover 13 and the impeller 71.

In some implementations, the motor housing 14 may have a hollow cylindrical shape having an open surface. The air outlet 12 through which air inside the motor housing 14 is discharged to the outside may be formed in the motor housing 14.

The stator 2 may be mounted to the motor body 1. The stator 2 may be mounted to the motor housing 14, and may be mounted to the motor housing 14 to surround the outer circumference of the rotor 4. The stator 2 may be mounted to the motor housing 14 using a fastening member such as a screw. The stator 2 may be formed in a hollow cylindrical shape. The stator 2 may be mounted to surround the outer circumference of the rotor 4.

The stator 2 may be configured as an assembly of a plurality of members. The stator 2 may include a stator core 21, a pair of insulators 22 and 23 coupled to the stator core 21, and a coil 24 disposed at the insulators 22 and 23.

The rotating shaft 3 may be disposed long from the inside of the motor housing 14 to the inside of the impeller cover 13. A portion of the rotating shaft 3 may be located inside the motor housing 14, and the rest of the rotating shaft 3 may be located inside the impeller cover 13.

The rotating shaft 3 is rotated together with the rotor 4, and may be supported by the rolling bearing 5. The rotating shaft 3 may be rotatably located inside the motor body 1. The rotating shaft 3 may be rotated by the rotor 4 in the state in which the rotating shaft 3 is supported by the rolling bearing 5.

The impeller 71 may be connected to the rotating shaft 3. When the rotating shaft 3 rotates, the impeller 71 may be rotated inside the impeller cover 13.

In some implementations, an example impeller connection part 32 to which the impeller 71 is connected may be formed at the rotating shaft 3. The impeller connection part 32 may be formed at a position spaced apart from a portion 31 surrounded by the rotor 4. The impeller connection part 32 may be formed at an end portion of the rotating shaft 3.

A second bearing mounting part at which a second bearing is mounted may be formed at the rotating shaft 3, which will be described later.

The rotor 4 may be mounted to surround a portion of the rotating shaft 3. The rotor 4 may be rotatably located inside the stator 2. The rotor 4 may be formed in a hollow cylindrical shape.

The rotor 4 may include an iron core 41 fixed to the rotating shaft 3, a magnet 42 installed at the iron core 41, and a pair of end plates 43 and 44 that fix the magnet 42.

The rotor 4 may be mounted to surround the portion 31 between one end and the other end of the rotating shaft 3. The rotor 4 may be mounted between the impeller connection part 32 and the second bearing mounting part.

The rolling bearing 5 may be accommodated inside the rolling bearing housing part 81 formed in at least one of the motor body 1 and the bracket 8. The rolling bearing 5 may rotatably support the rotating shaft 3 in a state in which the rolling bearing 5 is supported by the rolling bearing housing part 81.

Through-holes H of the elastic mesh 54 may face each of the outer surface of the outer rim 52 and the inner surface of the rolling bearing housing part 81.

The thickness of the elastic mesh 54 may be equal to or smaller than that of a gap between the outer circumferential surface of the outer rim 52 and the inner circumferential surface of the rolling bearing housing part 81. The elastic mesh 54 may be press-fitted between the outer circumferential surface of the outer rim 52 and the inner circumferential surface of the rolling bearing housing part 81.

In an example of the motor M, the rolling bearing housing part 81 in which the rolling bearing 5 is accommodated may be provided to each of the motor body 1 and the bracket 8, and the rolling bearing 5 of this implementation may be accommodated in each of the rolling bearing housing part 81 formed at the motor body 1 and the rolling bearing housing part 81 formed at the bracket 8. In this case, the rolling bearing 5 accommodated in the rolling bearing housing part 81 of the motor body 1 and the rolling bearing 5 accommodated in the rolling bearing housing part 81 of the bracket 8 may be disposed to be spaced apart from each other with the rotor 4 interposed therebetween, and the weight of the rotating shaft 3 may be distributed by the pair of rolling bearings 5 spaced apart from each other with the rotor 4 interposed therebetween.

In another example of the motor M, a portion of the rotating shaft 3, which is located inside the motor housing 14, may be directly supported by the motor housing 14. When the rotating shaft 3 is directly supported by the motor housing 14, a rotating shaft support part rotatably supporting the rotating shaft 3 may be formed in the motor housing 14. The rotating shaft support part may be formed in the motor housing 14 to surround the outer circumference of the rotating shaft 3. In some cases, a lubrication medium for preventing abrasion between the rotating shaft 3 and the rotating shaft support part, such as a lubricant, may be provided to at least one of the rotating shaft 3 and the rotating shaft support part.

In still another example of the motor M, the portion of the rotating shaft 3, which is located inside the motor housing 14, may be supported through the second bearing. In this case, the motor M may further include the second bearing mounted to the rotating shaft 3, and the second bearing may rotatably support the rotating shaft 3. The second bearing may include an inner rim fixed to the rotating shaft 3, an outer rim spaced apart from the inner rim, and a rolling member disposed between the inner rim and the outer rim.

When the motor M includes the second bearing supported by the motor housing 14, a second bearing support part larger than the rotating shaft 3 may be formed in the motor housing 14. The outer rim of the second bearing may come in contact with the second bearing support part to be supported by the second bearing support part. The second bearing may be mounted to the rotating shaft 3 to be spaced apart from the rolling bearing 5.

The second bearing may be spaced apart from the rolling bearing 5 in the length direction of the rotating shaft 3. The rolling bearing 5 and the second bearing may rotatably support the rotating shaft 3 at positions spaced apart from each other. In this case, the rolling bearing 5 and the second bearing may be mounted to be spaced apart from each other with the rotor 4 interposed therebetween, and the weight of the rotating shaft 3 may be distributed by the rolling bearing 5 and the second bearing.

Hereinafter, the case where the rolling bearing housing part 81 having the rolling bearing 5 accommodated therein is provided to each of the motor body and the bracket 8, and the pair of rolling bearings 5 spaced apart from each other with the rotor 4 interposed therebetween rotatably support the rotating shaft 3 will be described as an example.

In some implementations, an O-ring 60 may be fixed to the rotating shaft 3. The O-ring 60 may be included in a rotating shaft assembly or rotor assembly together with the rotating shaft 3 and the rotor 4.

The O-ring 60 may be located between the rolling bearing 5 and the rotor 4 in the length direction of the rotating shaft 3, and may restrict the rolling bearing 5 from moving toward the rotor 4. The O-ring 60 may serve as a bearing stopper supporting the rolling bearing 5.

The O-ring 60 may be fixed to the rotating shaft 3 to come in contact with a portion of the rolling bearing 5. At least a portion of the O-ring 60 may face the inner rim 51 of the rolling bearing 5. The O-ring 60 may come in contact with the inner rim 51 of the rolling bearing 5. The O-ring 60 may be a bearing stopper that restricts the inner rim 51 of the rolling bearing 5 from sliding toward the rotor 4.

The external diameter of the O-ring 60 may be smaller than the internal diameter of the elastic mesh 54. The O-ring 60 may be located inside the elastic mesh 54. When the rotating shaft 3 rotates, the O-ring 60 may be rotated in an empty space formed inside the elastic mesh 54.

In some implementations, a gap may be formed between the outer circumference of the O-ring 60 and the elastic mesh 54. In this case, the O-ring 60 and the elastic mesh 54 may not come in contact with each other. When the O-ring 60 and the elastic mesh 54 comes in contact with each other, at least one of the O-ring 60 and the elastic mesh 54 may be abraded. When the O-ring 60 and the elastic mesh 54 do not come in contact with each other, the lifespan of each of the O-ring 60 and the elastic mesh 54 may increase.

The O-ring 60 may be mounted to the rotating shaft 3, come in contact with the inner rim 51 of the rolling bearing 5, and be spaced apart from the elastic mesh 54.

The O-ring 60 may include an inner ring 61 coming in contact with the inner rim 51 and an outer ring 62 spaced apart from the outer rim 52 and the elastic mesh 54. The outer circumference of the outer ring 62 may be the outer circumference of the O-ring 60, and the external diameter of the outer ring 62 may be the external diameter of the O-ring 60.

The impeller 71 may be rotated together with the rotating shaft 3 in the state in which the impeller 71 is connected to the rotating shaft 3. The impeller 71 may be located between the impeller cover 13 and the diffuser 74 which will be described later.

The diffuser 74 may be mounted to at least one of the impeller cover 13 and the bracket 8.

The diffuser 74 may include a body part 75 having a smaller size than the impeller cover 13, a diffuser vane 76 protruding from the outer circumference of the body part 75, and a guide vane 77 guiding air flowed by the diffuser vane 76.

The diffuser vane 76 may be formed to the dynamic pressure of air passing through the impeller 71 to static pressure.

The guide vane 77 may be formed to guide air of which pressure is increased by the diffuser vane 76 to at least one of the rolling bearing 5 and the rotor 4.

The guide vane 77 may guide air toward between the rolling bearing 5 and the rotor 4, and a portion of the air guided by the guide vane 77 may be introduced into the elastic mesh 54 of the rolling bearing 5 to dissipate heat of the outer rim 52, the elastic mesh 54, and the bracket 8.

The rolling bearing housing part 81 formed in the motor body 1 may be formed in the motor housing 14. The rolling bearing housing part 81 may be formed at a portion of the motor housing 14, which faces the rotor 4, to protrude toward the rotor 4. The motor housing 14 may further include a cover part 82 covering between the inner rim 51 and the outer rim 52 of the rolling bearing 5, and the rolling bearing housing part 81 of the motor housing 14 may protrude from the cover part 82 of the motor housing 14.

The bracket 8 may be mounted to at least one of the motor housing 14 and the impeller cover 13. The rolling bearing housing part 81 formed at the bracket 8 may be formed at a central portion of the bracket 8.

In some implementations, the bracket 8 may further include a cover part covering the inner rim 51 and the outer rim 52 of the rolling bearing 5. The cover part 82 formed at the bracket 8 may be formed in a shape bent from the rolling bearing housing part 81. The cover part 82 may be formed in a ring shape at one end of the rolling bearing housing part 81, and a rotating shaft through-hole 83 through which the rotating shaft 3 rotatably passes may be formed in the cover part 82. The diameter of the rotating shaft through-hole 83 may be smaller than the internal diameter of the rolling bearing housing part 81.

The cover part 82 formed at the bracket 8 may be spaced apart from the O-ring 60, and a bearing accommodation space in which the rolling bearing 5 is accommodated may be formed between a surface of the O-ring 60, which faces the rolling bearing 5, and a surface of the cover part 82, which faces the rolling bearing 5.

The bracket 8 may include a fastening part 84 fastened to at least one of the motor housing 14 and the impeller cover 13. The fastening part 84 may be formed in a ring shape. The fastening part 84 may be fastened to at least one of the motor housing 1 and the impeller cover 13 using a fastening member 85 such as a screw. The fastening part 84 may be formed larger than the rolling bearing housing part 81. The bracket 8 may include at least one connection part 86 connecting the fastening part 84 and the rolling bearing housing part 81.

The pair of rolling bearings 5 in this implementation are mounted such that their center axes correspond to each other. When the center axes do not correspond to each other, the abrasion of any one of the pair of rolling bearings 5 may be increased.

In the motor M, the center axis of the rolling bearing housing part 81 formed at the bracket 8 and the center axis of the rolling bearing housing part 81 formed in the motor housing 14 may not correspond to each other due to an assembly tolerance of the motor housing 14 and the bracket 8.

In this implementation, although the center axis of the rolling bearing housing part 81 formed at the bracket 8 and the center axis of the rolling bearing housing part 81 formed in the motor housing 14 do not correspond to each other or do not align to each other, the center axes of the pair of rolling bearings 5 can correspond to each other or align to each other as the elastic mesh 54 is elastically deformed by the outer rim 52.

For example, the center axis of the rolling bearing housing part 81 formed at the bracket 8 and the center axis of the rolling bearing housing part 81 formed in the motor housing 14 may not correspond to each other in the left-right direction due to an assembly tolerance of the motor M.

In this case, the position of the outer rim of any one of the pair of rolling bearings 5 may be adjusted to be biased to the left in the rolling bearing housing part 81 formed at the bracket 8, and the position of the outer rim of the other of the pair of rolling bearings 5 may be adjusted to be biased to the right in the rolling bearing housing part 81 formed at the bracket 8. Thus, the center axes of the pair of rolling bearings 5 can correspond to each other.

Hereinafter, heat dissipation of the rolling bearing will be described in detail as follows.

In the motor M, when the rotating shaft 3 rotates, the impeller 71 may be rotated, and air may be suctioned into the impeller 71 through the air inlet 11.

The air suctioned into the impeller 71 may be flowed into the diffuser 74 by the impeller 71, and the air flowed into the diffuser 74 may be sequentially guided by the diffuser vane 76 and the guide vane 77.

A portion of the air guided by the guide vane 77 may be introduced into the through-holes H formed in the elastic mesh 54 around the rolling bearing 5.

A process in which air is introduced into the elastic mesh 54 will be described in detail. Air may be introduced into the elastic mesh 54 through the through-holes formed at the end part 58 of the elastic mesh 54, and a portion of the air may be guided to the outer rim 52 of the rolling bearing 5 and the rolling bearing housing part 81 to be introduced into a gap between the outer rim 52 of the rolling bearing 5 and the rolling bearing housing part 81. The air can dissipate heat of each of the outer rim 52 of the rolling bearing 5, the elastic mesh 54, and the rolling bearing housing part 81.

Figure 6:
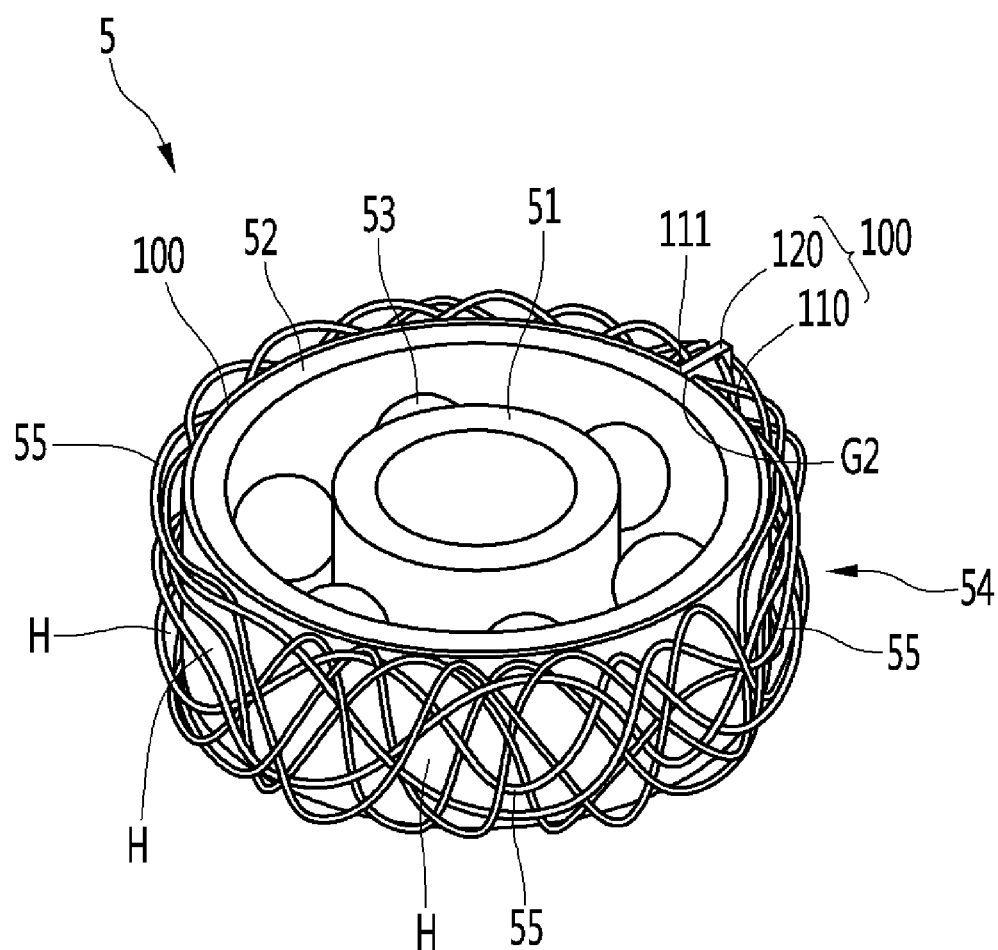
FIG. 6 is a perspective view showing another example rolling bearing.
Figure 7:
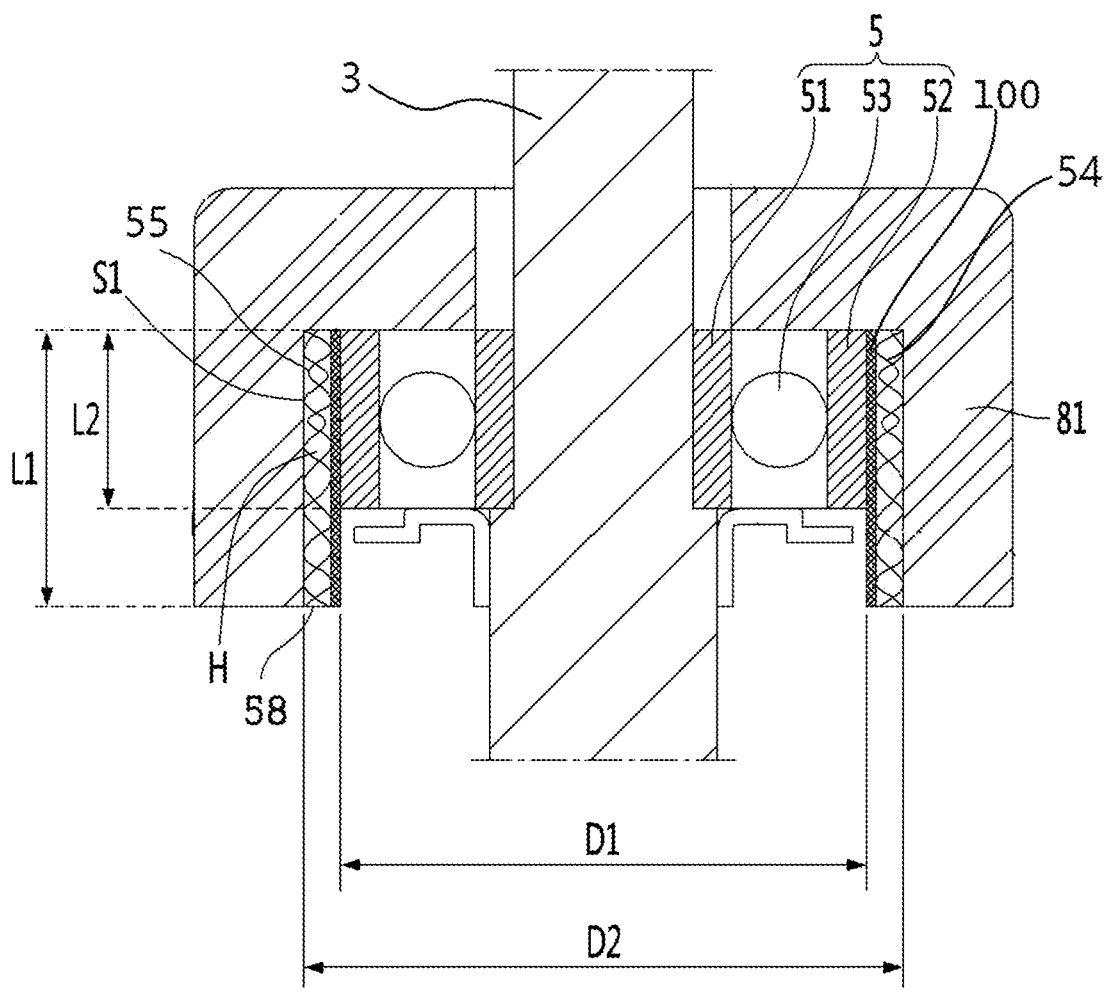
FIG. 7 is a sectional view showing the example rolling bearing.
Figure 8:
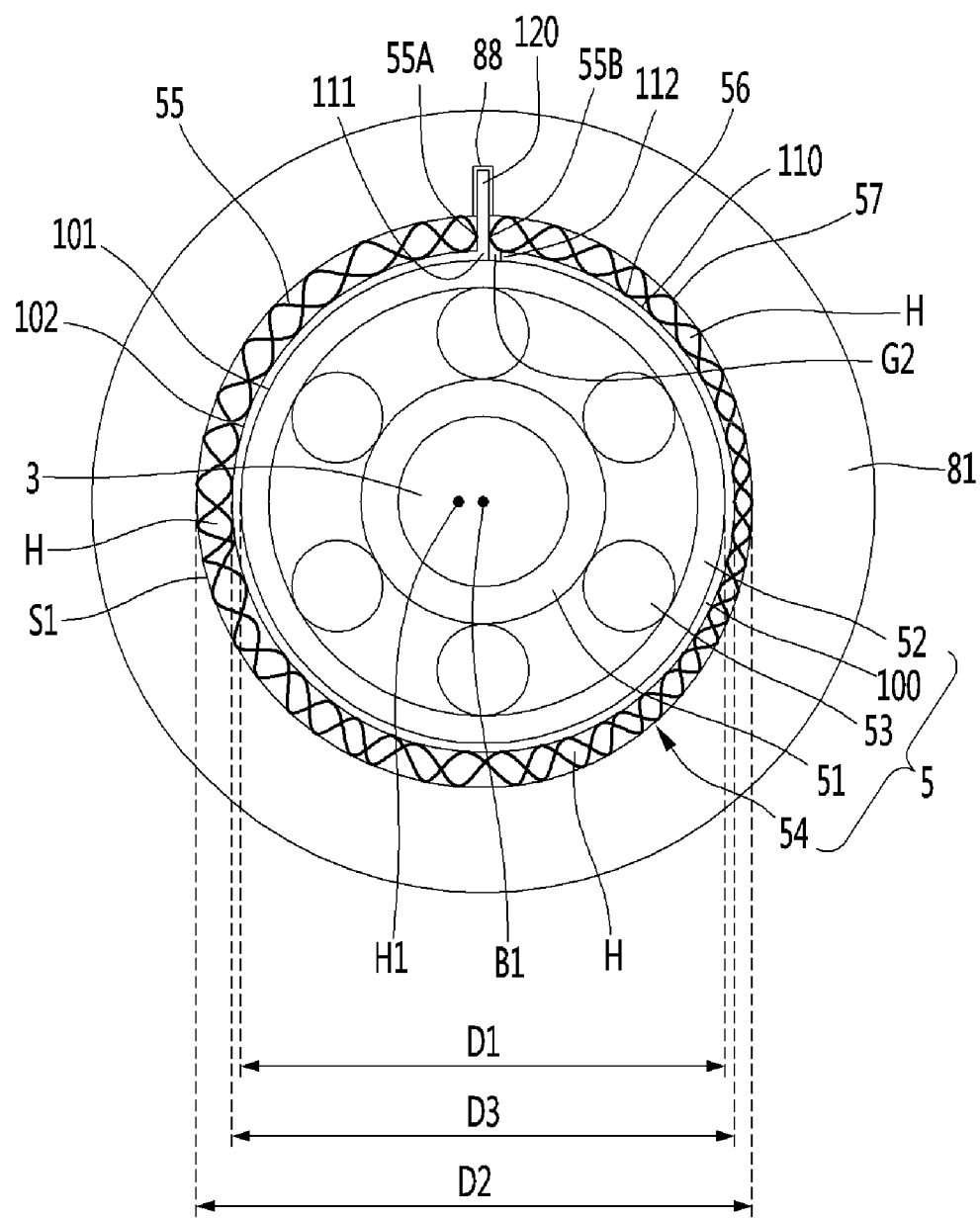
FIG. 8 is a cross-sectional view showing the rolling bearing shown in FIG. 6 with an example elastic mesh elastically deformed.

FIG. 6 is a perspective view showing another example rolling bearing. FIG. 7 is a sectional view showing the example rolling bearing. FIG. 8 is a cross-sectional view when an elastic mesh shown in FIG. 6 is elastically deformed.

The rolling bearing 5 may further include an inner holder 100 disposed between the outer rim 52 and the elastic mesh 54. In this implementation, the other components except the inner holder 100 and their operations are identical or similar to those of first implementation. Therefore, the components are designated by like reference numerals, and their detailed descriptions will be omitted.

The inner holder 100 may have an inner surface 101 coming in contact with the outer circumference of the outer rim 52 and an outer surface 102 coming in contact with the elastic mesh 54. The inner surface 101 of the inner holder 100 may be an outer rim contact surface coming in contact with the outer rim 52, and the outer surface 102 of the inner holder 100 may be an elastic mesh contact surface coming in contact with the elastic mesh 54.

The external diameter D3 of the inner holder 100 may be formed to be greater than or equal to the external diameter D1 of the outer rim 52 and to be smaller than the internal diameter D2 of the rolling bearing housing part 81. In this implementation, an accommodation space S1 may be formed between the outer surface 102 of the inner holder 100 and the inner surface of the rolling bearing housing part 81, and at least a portion of the elastic mesh 54 may be disposed to be inserted between the outer surface 102 of the inner holder 100 and the inner surface of the rolling bearing housing part 81.

In some implementations, an example of the inner holder 100 may be formed in a hollow cylindrical shape to surround the entire outer circumference of the outer rim 52. The inner holder 100 may be manufactured such that a quadrangular strip-shape plate is curled in an approximately hollow cylindrical shape, and one end and the other end of the plate are bonded to each other by welding or using an adhesive, for instance.

In some implementations, another example of the inner holder 100 may be formed in an arc shape to surround a portion of the outer circumference of the outer rim 52. In this case, a gap G2 open in a radial direction of the inner holder 100 may be formed in the inner holder 100. The inner holder 100 may be manufactured such that a quadrangular strip-shape plate is curled in an arc shape, and the gap G2 is formed between one end and the other end of the plate.

The inner holder 100 may be located inside the elastic mesh 54, and may protect the outer rim 52 between the outer rim 52 and the elastic mesh 54. The inner holder 100 may block the metal wire 55 of the elastic mesh 54 from coming in direct contact with the outer circumferential surface of the outer rim 52, and thus damage of the outer rim 52, caused by the metal wire 55, can be minimized.

The inner holder 100 may be formed of a type of material having high heat transfer performance such that heat of the outer rim 52 is transferred to the elastic mesh 54. The inner holder 100 may be formed of a metallic material such as aluminum or steel.

In some implementations, the inner holder 100 may protect the outer rim 52 while not being damaged by the elastic mesh 54. In order to minimize the damage of the inner holder 100, caused by the elastic mesh 54, a separate coating layer such as Teflon coating, may be further formed on the outer circumference of the inner holder 100.

The inner holder 100 may be fixed to the elastic mesh 54 not to run idle together with the outer rim 52 inside the elastic mesh 54. An elastic mesh insertion groove into which a portion of the elastic mesh 54 is inserted and stuck may be formed in the inner holder 100.

In some cases, the position of the inner holder 100 may be varied together with the outer rim 52 inside the elastic mesh 54. If the outer rim 52 is moved to be biased to one side inside the elastic mesh 54, the position of the inner holder 100 may be varied together with the outer rim 52 in a state in which the inner holder 100 is fixed to the outer rim 52.

In this implementation, the outer rim 52 may be inserted into the inner holder 100 to be adhered closely to the inner holder 100, and the inner holder 100 may be inserted into the elastic mesh 54 to be adhered closely to the elastic mesh 54.

The rolling bearing 5 may be mounted to the rolling bearing housing part 81 in a state in which the inner rim 51, the rolling member 53, the outer rim 52, the inner holder 100, and the elastic mesh 54 are coupled together.

In some implementations, in this implementation, the inner holder 100 may fix the outer rim 52 in a state in which the inner holder 100 is fixed to the rolling bearing housing part 81.

The inner holder 100 may include an outer rim holder part 110 surrounding the outer rim 52, the outer rim holder part 110 coming in contact with the outer circumference of the outer rim 52, and a fixing part 120 protruding from the outer rim holder part 110 to fix the inner holder 100.

When the inner holder 100 includes both of the outer rim holder part 110 and the fixing part 120, the outer rim 52 may be located inside the outer rim holder part 110. The outer rim 52 may be press-fitted into the outer rim holder part 110. The outer rim 52 may be fixed to the outer rim holder part 110 to be adhered closely to the outer rim holder part 110.

The outer rim holder part 110 may be pressurized to the outer rim 52 of the rolling bearing 5 by the elastic mesh 54. The inner surface of the outer rim holder part 110 may be adhered closely to the outer circumferential surface of the outer rim 52 of the rolling bearing 5.

The outer rim holder part 110 may have a smaller size than the rolling bearing housing part 81.

The outer rim holder part 110 may be formed in a circular or arc shape. The outer rim holder part 110 may have the inner surface coming in contact with the outer circumference of the outer rim 52 and the outer surface 102 coming in contact with the elastic mesh 54.

The outer rim holder part 110 may have a bent arc shape, for instance. One end 111 of the outer rim holder part 110 and the other end 112 of the outer rim holder part 110 may be spaced apart from each other. In this case, the gap G2 may be formed between the one end 111 of the outer rim holder part 110 and the other end 112 of the outer rim holder part 110. The gap G2 may be open in the radial direction of the inner holder 100. In this case, the outer rim holder part 110 may surround only a portion of the outer circumferential surface of the outer rim 52. In some implementations, the fixing part 120 may protrude from the one end of the outer rim holder part 110 to the rolling bearing housing part 81.

In some implementations, the inner holder 100 may be manufactured from a strip-shaped plate, and a portion of the strip-shaped plate may be curled in an arc shape, thereby constituting the outer rim holder part 110. In this case, a portion of the strip-shaped plate, which is not curled in the arc shape, may be bent outward from the one end 111 of the outer rim holder part 110 to be used as the fixing part 120. A portion of the fixing part 120 bent from the one end 111 of the outer rim holder part 110 may be fixed to the rolling bearing housing part 81.

The inner holder 100 may be formed such that the outer rim holder part 110 is formed in a hollow cylindrical shape and the fixing part 120 protrudes outward from the one end 111 of the outer rim holder part 110. In this case, the gap open in the radial direction may not be formed in the outer rim holder part 110.

For example, the inner holder 100 may be manufactured from a strip-shaped plate. A portion of the strip-shaped plate may be curled in an arc or circular shape, and a portion of the strip-shaped plate, which is not curled in the arc or circular shape, may be bent outward from the one end 111 of the outer rim holder part 110 having the arc or circular shape to be used as the fixing part 120. The one end 111 and the other end 112 of the portion curled in the arc or circular shape may be bonded to each other by welding or using an adhesive, for instance. In this case, the outer rim holder part 110 may surround the entire outer circumferential surface of the outer rim 52, and may be fixed to the outer rim 52 in a state in which the outer rim holder part 110 is entirely formed in a hollow cylindrical shape.

The fixing part 120 may extend from the outer rim holder part 110 to the rolling bearing housing part 81 to be fixed to the rolling bearing housing part 81.

The fixing part 120 may have a shape bent outward from the one end 111 of the outer rim holder part 110 or a shape protruding outward from the one end 111 of the outer rim holder part 110.

In some implementations, the fixing part 120 may protrude in a plate shape from the outer rim holder part 110.

The fixing part 120 may protrude in a plate shape from the one end 111 of the outer rim holder part 110, and the other end 112 of the outer rim holder part 110 may be spaced apart from the fixing part 120. The protruding width of the fixing part 120 may be greater than the thickness of the elastic mesh 54. Here, the protruding width of the fixing part 120 may be a length where the fixing part 120 extends in the radial direction of the inner holder 100.

When the outer rim 52 is biased inside the rolling bearing housing part 81, the shape of the outer rim holder part 110 or the angle between the outer rim holder part 110 and the fixing part 120 may be changed depending on the force applied to the outer rim 52.

In some implementations, the outer rim holder part 110 may support the rolling bearing 5 as the shape of the outer rim holder part 110 is changed. As the gap G2 between the one end 111 and the other end 112 of the outer rim holder part 110 is varied, the outer rim holder part 110 may support the rolling bearing 5 such that the center axis of the outer rim 52 is varied. The outer rim holder part 110 may support the outer rim 52 as the curvature of a portion of the outer rim holder part 110 is varied depending on the position of the outer rim 52. In this case, the gap G2 between the one end 111 and the other end 112 of the outer rim holder part 110 may be increased or decreased according to the position of the rolling bearing 5.

In some implementations, the outer rim holder part 110 may support the outer rim 52 as the position of the outer rim holder part 110 is varied. The entire shape of the outer rim holder part 110 may be constantly maintained, and the angle between the outer surface of the outer rim holder part 110 and the fixing part 120 may be varied. The outer rim holder part 110 may be rotated clockwise or counterclockwise at a predetermined angle using the fixing part 120 as a center axis to elastically pressurize the elastic mesh 54 as the position of the center axis is changed. In some implementations, if an external force is removed, the outer rim holder part 110 may be returned to the original position by the external force applied to the outer rim holder part 110.

A fixing groove 88 having the fixing part 120 inserted and stuck thereinto may be formed in the rolling bearing housing part 81.

The fixing groove 88 may be formed in the inner circumferential surface of the rolling bearing housing part 81. The fixing groove 88 may be parallel to the rotating shaft 3. A portion of the fixing part 120 may be inserted and stuck into the fixing groove 88, and the rest of the fixing part 120 may be located in a space formed inside the rolling bearing housing part 81.

In this implementation, when the inner holder 100 is fixed to the rolling bearing housing part 81 through the fixing part 120, and the outer rim 52 is fixed to the outer rim holder part 110, the outer rim 52 may be supported by the outer rim holder part 110 in the state in which the outer rim 52 is adhered closely to the outer rim holder part 110. Thus, when the inner rim 51 is rotated, the rotation of the outer rim 52 can be minimized.

The elastic mesh 54 may be disposed between the rolling bearing housing part 81 and the outer rim holder part 110.

The inner circumferential surface 56 of the elastic mesh 54 may come in contact with the outer surface 102 of the outer rim holder part 110, and the outer circumferential surface 57 of the elastic mesh 54 may come in contact with the inner surface of the rolling bearing housing part 81.

One end 55A of the elastic mesh 54 may face one surface of the fixing part 120, and the other end 55B of the elastic mesh 54 may face the other surface of the fixing part 120. Both the ends 55A and 55B of the elastic mesh 54 may be spaced apart from each other with the fixing part 120 interposed therebetween. The one end 55A and the other end 55B of the elastic mesh 54 may be spaced apart from each other by the fixing part 120, and the elastic mesh 54 may be entirely disposed in an arc shape.

The elastic mesh 54 and the inner holder 100 may adjust the position of the outer rim 52 to be aligned to the regular position in a state in which the elastic mesh 54 is elastically deformed by the inner holder 100.

The elastic mesh 54 may be elastically deformed between the inner holder 100 and the rolling bearing housing part 81 as the elastic mesh 54 is compressed by the inner holder 100. The elastic mesh 54 may support the inner holder 100.

A portion of the elastic mesh 54 may be disposed between the outer rim holder part 110 and the rolling bearing housing part 81. The internal diameter of the elastic mesh 54 may be equal to or slightly smaller than the external diameter of the outer rim holder part 110. In some implementations, the external diameter of the elastic mesh 54 may be equal to or smaller than the internal diameter D2 of the rolling bearing housing part 81. At least a portion of the elastic mesh 54 may be press-fitted between the outer rim holder part 110 and the rolling bearing housing part 81. The elastic mesh 54 may be fixed to the outer rim holder part 110 and the rolling bearing housing part 81 in the state in which the portion of the elastic mesh 54 is press-fitted.

Heat of the outer rim 52 may be transferred to the elastic mesh 54 through the outer rim holder part 110, and heat of the elastic mesh 54 may be transferred to the rolling bearing housing part 81.

That is, the heat of the outer rim 52 may be transferred to the elastic mesh 54 through the inner holder 100, and the heat transferred to the elastic mesh 54 may be transferred to the rolling bearing housing part 81 through the elastic mesh 54.

A portion of the air inside the motor M may be introduced into the elastic mesh 54 through the through-holes H of the elastic mesh 54. Thus, the air introduced into the elastic mesh 54 can dissipate heat of each of the inner holder 100, the elastic mesh 54, and the rolling bearing housing part 81 while passing through the through-holes H.

Figure 9:
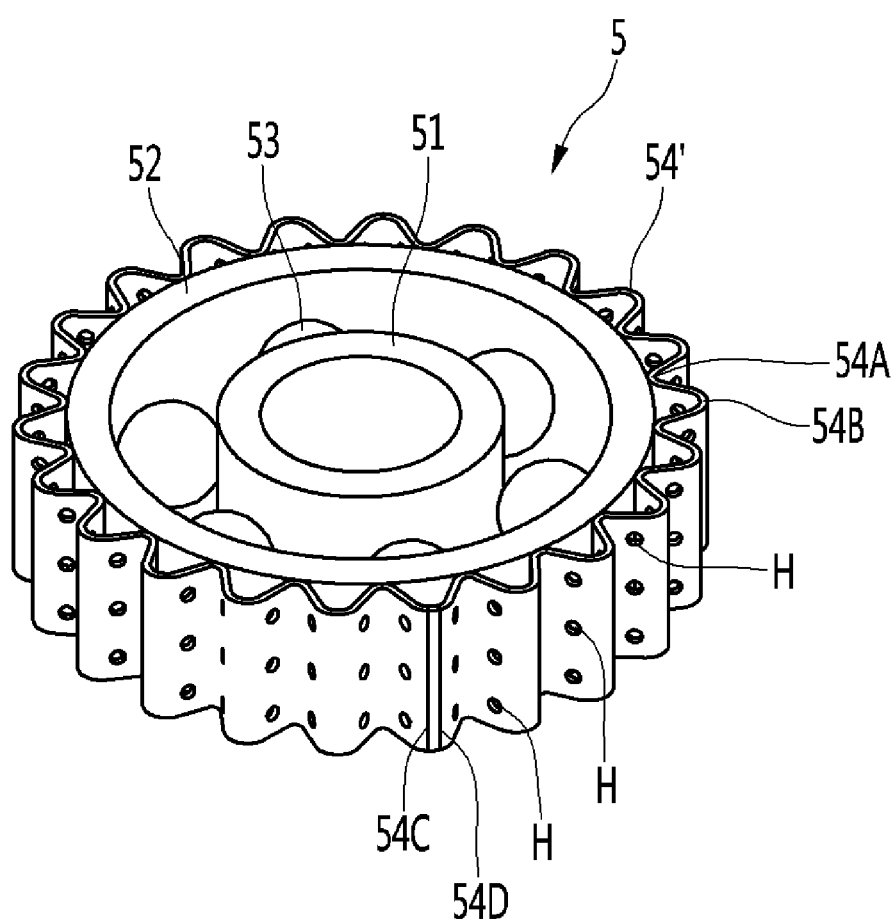
FIG. 9 is a perspective view showing another example rolling bearing.
Figure 10:
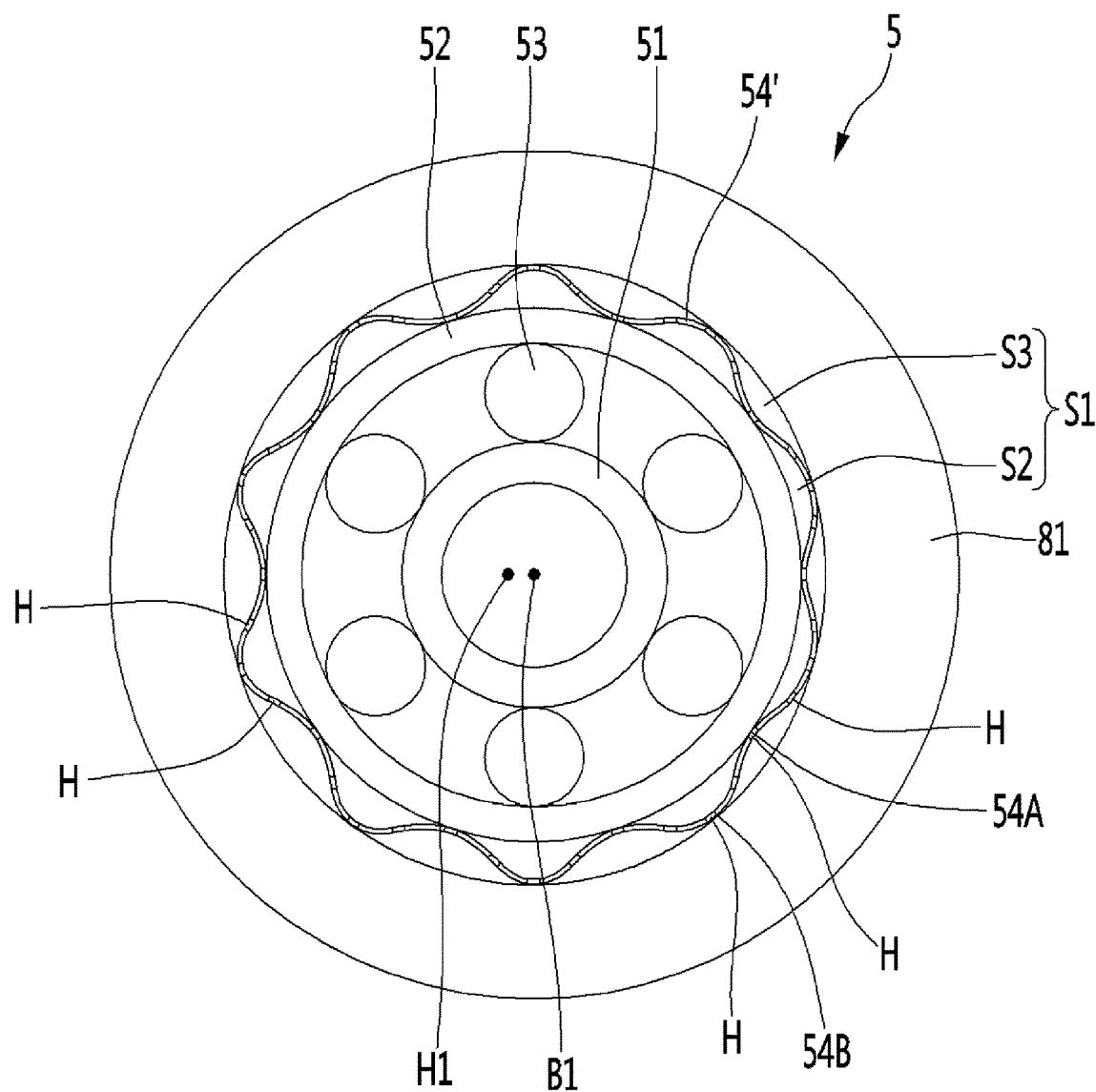
FIG. 10 is a cross-sectional view showing the rolling bearing shown in FIG. 9 with an example elastic mesh elastically deformed.

FIG. 9 is a perspective view showing another example rolling bearing. FIG. 10 is a cross-sectional view when an example elastic mesh or elastic support structure shown in FIG. 9 is elastically deformed.

The rolling bearing 5 may include an elastic mesh 54' formed in a zigzag shape along the outer rim 52. In this implementation, the other components except the elastic mesh 54' and their operations are identical or similar to those of first implementation. Therefore, the components are designated by like reference numerals, and their detailed descriptions will be omitted.

The zigzag-shaped elastic mesh 54' may be formed of a metal having high heat transfer performance. The elastic mesh 54' may be a type of elastic support structures. The elastic mesh 54' may be configured such that a plurality of metal wires are irregularly coupled, or may be configured such that a plurality of metal wires are regularly arranged in a grid pattern, etc.

The elastic mesh 54' may include a contact part 54A coming in contact with the outer rim 52 and a spacing part 54B spaced apart from the outer rim 52. The contact part 54A and the spacing part 54B may be configured as a protruding part and a recessed part, which are alternately disposed along the circumference of the outer rim 52.

A portion of the contact part 54A, which is located at the innermost side, may come in contact with the outer circumferential surface of the outer rim 52. A portion of the spacing part 54B, which is located at the outermost side, may come in contact with the inner circumferential surface of the rolling bearing housing part 81.

The contact part 54A and the spacing part 54B may be alternately located along the outer rim 52. The elastic mesh 54' may be entirely formed in a hollow cylindrical shape, and the contact part 54A and the spacing part 54B may be alternately formed in the circumferential direction.

In the elastic mesh 54', through-holes H may be formed in each of the contact part 54A and the spacing part 54B.

The accommodation space S1 between the outer rim 52 and the rolling bearing housing part 81 may be divided into an inner air path S2 between the inner surface of the elastic mesh 54' and the outer rim 52, and an outer air path S3 between the outer surface of the elastic mesh 54' and the rolling bearing housing part 81.

Each of the inner air path S2 and the outer air path S3 may be formed long in the axial direction of the rolling bearing 5. In the accommodation space S1 between the outer rim 52 and the rolling bearing housing part 81, the inner air path S2 and the outer air path S3 may be alternately formed in the circumferential direction with the elastic mesh 54' interposed therebetween.

The through-holes H formed in the elastic mesh 54' may allow the inner air path S2 and the outer air path S3 to communicate with each other. Air can more rapidly cool each of the outer rim 52, the elastic mesh 54', and the rolling bearing housing part 81 while passing through the inner air path S2 and the outer air path S3.

In some implementations, air between the outer surface of the elastic mesh 54' and the rolling bearing housing part 81 may come in contact with the outer rim 52 through the through-holes H formed in the contact part 54A. In some implementations, air between the outer rim 52 of the rolling bearing 5 and the inner surface of the elastic mesh 54' may come in contact with the inner circumferential surface of the rolling bearing housing part 81 through the through-holes H formed in the spacing part 54B.

The elastic mesh 54' may entirely have a hollow cylindrical shape as a strip-shaped mesh part in which an uneven part and through-holes H are formed in the length direction is curled in a hollow cylindrical shape, and one end 54C and the other end 54D of the mesh part are bonded to each other.

Figure 11:
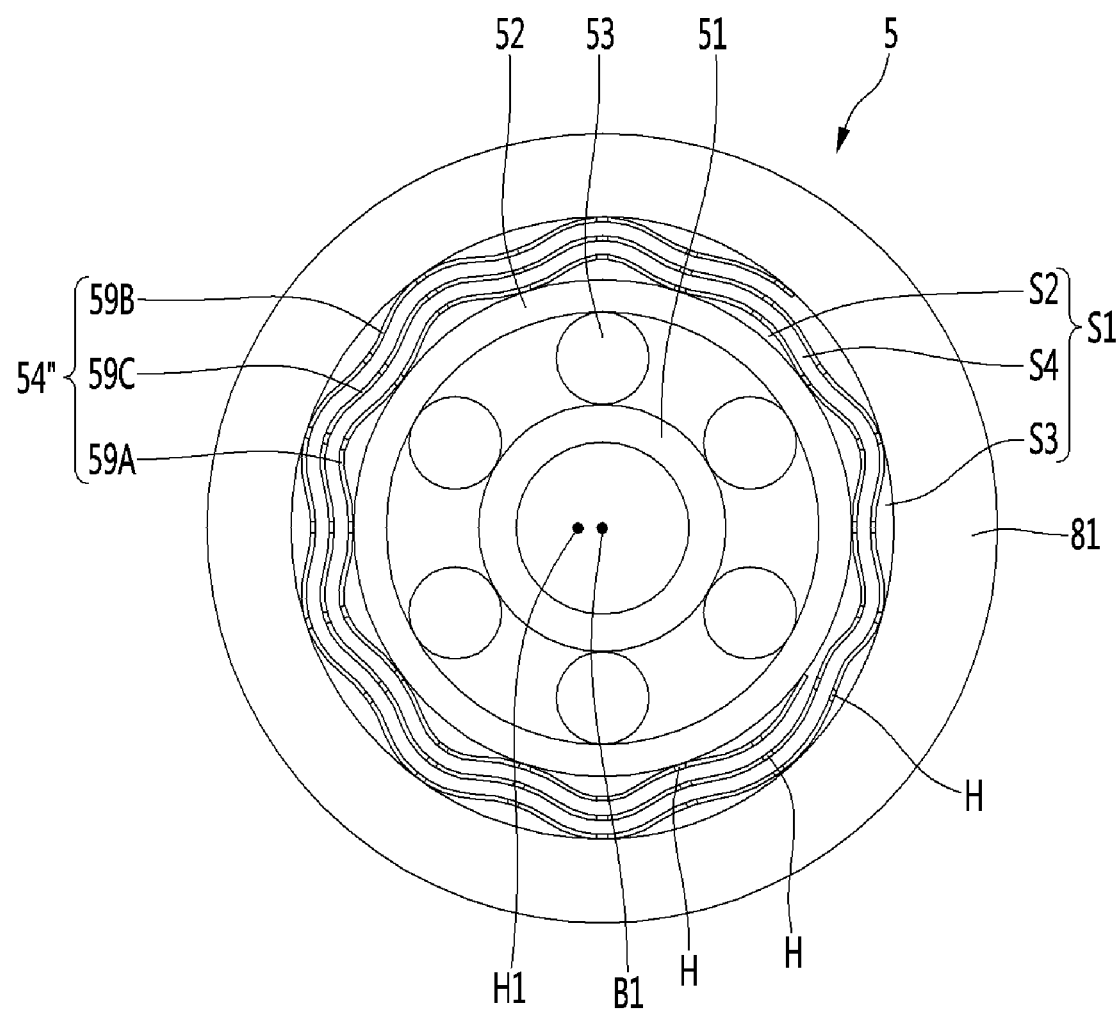
FIG. 11 is a cross-sectional view showing another example elastic mesh elastically deformed in another example rolling bearing.

FIG. 11 is a cross-sectional view showing another example rolling bearing when an example elastic mesh in the rolling bearing is elastically deformed.

The rolling bearing 5 may include an elastic mesh 54" having a shape in which a mesh part having through-holes H formed therein is curled at least twice. In this implementation, the other components except the elastic mesh 54''' and their operations are identical or similar to those of first implementation. Therefore, the components are designated by like reference numerals, and their detailed descriptions will be omitted.

The elastic mesh 54" may be manufactured as a strip-shaped mesh part is curled in a scroll shape plural times. The strip-shaped mesh part may be formed of a metal having high heat transfer performance. The elastic mesh 54" may be configured such that a plurality of metal wires are irregularly coupled, or may be configured such that a plurality of metal wires are regularly arranged in a grid pattern, etc.

In the elastic mesh 54", an inner mesh part 59A located at the innermost side in the radial direction of the elastic mesh 54" may come in contact with the outer circumferential surface of the outer rim 52. In some implementations, an outer mesh part 59B located at the outermost side in the radial direction of the elastic mesh 54" may come in contact with the rolling bearing housing part 81. The through-holes H may be formed in each of the inner mesh part 59A and the outer mesh part 59B.

The elastic mesh 54" may further include at least one center mesh part 59C located between the inner mesh part 59A and the outer mesh part 59B. The center mesh part 59C may be curled to surround the inner mesh part 59A, and the outer mesh part 59B may be curled to surround the center mesh part 59C. The through-holes H may be formed even in the center mesh part 59C.

The elastic mesh 54" may include the inner mesh part 59A and the outer mesh part 59B without the center mesh part 59C. In this case, the outer mesh part 59B may be curled to surround the inner mesh part 59A.

In this implementation, the elastic mesh 54" entirely formed in a hollow cylindrical shape can be manufactured through a simple process of curling, plural times, one strip-shaped mesh part in a scroll shape. Further, in this implementation, heat can be dissipated through not only through-holes formed in the mesh part but also air paths S2, S3, and S4 between the mesh parts 59A, 59B, and 59C, which are sequentially disposed in the radial direction.

An inner air path S2 may be formed between the outer circumferential surface of the outer rim 52 and the inner mesh part 59A. An outer air path S3 may be formed between the inner circumferential surface of the rolling bearing housing part 81 and the outer mesh part 59B. In some implementations, a center air path S4 may be formed between the inner air path S2 and the outer air path S3.

Although some implementations of the present disclosure are described for illustrative purposes, it will be apparent to those skilled in the art that various modifications and changes can be made thereto within the scope of the disclosure without departing from the essential features of the disclosure.

Accordingly, the aforementioned implementations should be construed not to limit the technical spirit of the present disclosure but to be provided for illustrative purposes so that those skilled in the art can fully understand the spirit of the present disclosure.

The scope of the present disclosure should not be limited to the aforementioned implementations but defined by appended claims. The technical spirit within the scope substantially identical with the scope of the present disclosure will be considered to fall in the scope of the present disclosure defined by the appended claims.

What is claimed is:

1. A rolling bearing comprising:
    an inner rim fixed to a rotating shaft;
    an outer rim spaced apart from the inner rim;
    a rolling member disposed between the inner rim and the outer rim; and
    an elastic mesh that has a hollow cylindrical shape, that defines a plurality of through-holes, and that faces and surrounds an outer circumferential surface of the outer rim,
    wherein the elastic mesh comprises a metal wire mesh comprising at least one metal wire,
    wherein the at least one metal wire comprises an inner contact part directly coming in contact with of the outer circumferential surface the outer rim, and
    wherein an internal diameter of the elastic mesh is less than an external diameter of the outer rim such that the outer rim is press-fitted into the elastic mesh.

2. The rolling bearing according to claim 1, wherein the at least one metal wire has one or more of curved portions including the inner contact part.

3. The rolling bearing according to claim 1, wherein an axial height of the elastic mesh is greater than an axial height of the outer rim.

4. The rolling bearing according to claim 1, wherein the elastic mesh has an end part not facing the outer rim, and
    wherein the plurality of through-holes comprise a through-hole formed in the end part of the elastic mesh.

5. The rolling bearing according to claim 1, wherein the elastic mesh includes:
    a contact part contacting the outer rim; and
    a spacing part spaced apart from the outer rim, the contact part and the space part being alternately located along the outer rim, and wherein the through-holes are defined in at least one of the contact part and the spacing part.

6. The rolling bearing according to claim 1, wherein the elastic mesh comprises:
   an inner mesh part located at an innermost side in a radial direction, the inner mesh part contacting the outer circumferential surface of the outer rim; and
   an outer mesh part located at an outermost side in the radial direction, and
   wherein the through-holes are defined in each of the inner mesh part and the outer mesh part.

7. The rolling bearing according to claim 1, wherein the plurality of through-holes comprise a first through-hole open in a radial direction, a second through-hole open in an axial direction, and a third through-hole open in an oblique direction between the radial direction and the axial direction.

8. A motor comprising:
   a motor body;
   a bracket installed within the motor body; and
   at least one rolling bearing that supports a rotating shaft located in the motor body,
   wherein at least one of the motor body and the bracket comprises a rolling bearing housing part that supports the rolling bearing,
   wherein the rolling bearing comprises:
      an inner rim fixed to the rotating shaft,
      an outer rim spaced apart from the inner rim,
      a rolling member disposed between the inner rim and the outer rim, and
      an elastic support structure that is porous and that surrounds an outer circumferential surface of the outer rim, and
   wherein the rolling bearing housing part contacts the elastic support structure to thereby support the elastic support structure,
   wherein the elastic support structure comprises an elastic mesh that has a hollow cylindrical shape, that defines a plurality of through-holes, and that is disposed between the outer circumferential surface of the outer rim and an inner circumferential surface of the rolling bearing housing part, the elastic mesh comprising at least one metal wire,
   wherein the at least one metal wire comprises an inner contact part directly coming in contact with the outer circumferential surface the outer rim,
   wherein the elastic mesh faces the outer circumferential surface of the outer rim and the inner circumferential surface of the rolling bearing housing part, and
   wherein an internal diameter of the elastic mesh is less than an external diameter of the outer rim such that the outer rim is press-fitted into the elastic mesh.

9. The motor according to claim 8, wherein the at least one metal wire has one or more of curved portions including the inner contact part.

10. The motor according to claim 8, wherein the at least one metal wire comprises an outer contact part directly coming in contact with of the inner circumferential surface of the rolling bearing housing part.

11. The motor according to claim 8, wherein the elastic mesh has an first end part facing an outside of the rolling bearing housing part and an second part facing an inner surface of the rolling bearing housing part.

12. The motor according to claim 8, wherein an axial height of the elastic mesh is greater than an axial height of the outer rim.

13. The motor according to claim 8, wherein the elastic mesh includes:
   a contact part contacting the outer rim; and
   a spacing part spaced apart from the outer rim, the contact part and the spacing part being alternately located along the outer rim,
   wherein the spacing part contacts the rolling bearing housing part, and
   wherein the plurality of through-holes are defined in at least one of the contact part and the spacing part.

14. The motor according to claim 8, wherein the elastic mesh further comprises:
   an inner mesh part located at an innermost side in a radial direction, the inner mesh part contacting the outer circumferential surface of the outer rim; and
   an outer mesh part located at an outermost side in the radial direction, the outer mesh part contacting the rolling bearing housing part, and
   wherein the plurality of through-holes are defined in each of the inner mesh part and the outer mesh part.

15. The motor according to claim 8, wherein the plurality of through-holes face each of the outer circumferential surface of the outer rim and the inner circumferential surface of the rolling bearing housing part.

16. The motor according to claim 8, wherein the elastic mesh has a thickness equal to or greater than a gap defined between the outer circumferential surface of the outer rim and the inner circumferential surface of the rolling bearing housing part, the elastic mesh being configured to be press-fitted into the gap.

* * * * *